(12) United States Patent
Zhou

(10) Patent No.: US 8,345,973 B2
(45) Date of Patent: Jan. 1, 2013

(54) ADAPTIVE LIGHT METHOD AND SYSTEM FOR LOW POWER ARCHITECTURES

(75) Inventor: Jianping Zhou, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 12/752,952

(22) Filed: Apr. 1, 2010

(65) Prior Publication Data

US 2011/0243440 A1    Oct. 6, 2011

(51) Int. Cl.
*G06K 9/00* (2006.01)

(52) U.S. Cl. .......................... 382/168; 382/162; 382/169

(58) Field of Classification Search .................. 382/162, 382/168, 169, 112, 174, 270; 340/937; 180/169; 358/1.14, 455; 701/300
See application file for complete search history.

(56) References Cited

U.S. PATENT DOCUMENTS

| | | | | |
|---|---|---|---|---|
| 4,931,937 A | * | 6/1990 | Kakinami et al. | 701/300 |
| 5,410,617 A | * | 4/1995 | Kidd et al. | 382/169 |
| 6,463,173 B1 | * | 10/2002 | Tretter | 382/168 |
| 7,903,844 B2 | * | 3/2011 | Satonaga et al. | 382/112 |

OTHER PUBLICATIONS

D. Jobson, Z. Rahman, and G. Woodell. "A multiscale retinex for bridging the gap between color images and the human observation of scenes," IEEE Trans. Image Processing, vol. 6, No. 7, Jul. 1997.
V. Brajovic. "Brightness perception, dynamic range, and noise: a unifying model for adaptive image sensors," IEEE Conf. Computer Vision and Pattern Recognition, vol. 2, pp. 189-196, 2004.

* cited by examiner

*Primary Examiner* — Anh Hong Do

(74) *Attorney, Agent, or Firm* — Kacvinsky Daisak PLLC

(57) ABSTRACT

Embodiments of an apparatus, system and method are described for an adaptive light method for low power architecture. A histogram with a plurality of bins may be determined based on luminance for an image. A tone differential may be decreased based on a sum of pixel counts from adjacent bins. The image may be displayed based at least in part on a tone differential of a bin. Other embodiments are described and claimed.

20 Claims, 4 Drawing Sheets

200

Determining a histogram with a plurality of bins based on luminance for each pixel in an image
205

For each bin in the histogram, setting a total pixel count to the sum of a first pixel count of a first bin and a second pixel count of a second bin, wherein the second bin is an adjacent bin
210

When the total pixel count is less than a pixel threshold, decreasing a tone differential
215

Setting the first pixel count of the first bin equal to the total pixel count
220

For each first bin where the tone differential was decreased, determining a third bin with a highest density
225

Increasing the tone differential for the third bin
230

Displaying the image based at least in part on a tone differential of a bin.
235

| Bin 0 | Bin 1 | Bin 2 | Bin 3 |
|---|---|---|---|
| Pixels: 40<br>ToneDiff: 1 | Pixels: 30<br>ToneDiff: 1 | Pixels: 20<br>ToneDiff: 1 | Pixels: 220<br>ToneDiff: 1 |
| 310 | 320 | 330 | 340 |

FIG. 3B

| Bin 0 | Bin 1 | Bin 2 | Bin 3 |
|---|---|---|---|
| Pixels: 40<br>ToneDiff: 1 | Pixels: 40 + 30 < 100<br>Tone Diff: 0 | Pixels: 70 + 20 < 100<br>Tone Diff: 0 | Pixels: 90 + 220 > 100<br>ToneDiff: 1 |
| 310 | 320 | 330 | 340 |

FIG. 3C

| Bin 0 | Bin 1 | Bin 2 | Bin 3 |
|---|---|---|---|
| Pixels: 40<br>ToneDiff: 1 | Pixels: 70<br>Tone Diff: 0 | Pixels: 90<br>Tone Diff: 0 | Pixels: 220<br>ToneDiff: 2 |
| 310 | 320 | 330 | 340 |

FIG. 3D

| Bin 0 | Bin 1 | Bin 2 | Bin 3 |
|---|---|---|---|
| ToneMapping: 0 | ToneMapping: 0 | ToneMapping: 0 | ToneMapping: 2 |
| 310 | 320 | 330 | 340 |

ADAPTIVE LIGHT METHOD AND SYSTEM FOR LOW POWER ARCHITECTURES

BACKGROUND

Adaptive light methods are used in photographic, video and display processing applications. Images may be sharpened and/or enhanced due to adaptive light solutions. Adaptive light methods have been implemented in digital signal processors (DSP), image signal processors (ISP), video processors, display processor, and graphics processing units (GPU). However, existing adaptive light methods require intensive computation and high power consumption. Due to the intensive computation and high power consumption, existing adaptive light methods, such as floating point operations, are not suitable for low power architectures or devices. Consequently, there exists a substantial need for an adaptive light method which does not require intensive computations and/or high power consumption.

BRIEF DESCRIPTION OF THE DRAWINGS

FIG. 2 illustrates one embodiment of a first logic diagram.
FIG. 3A illustrates one embodiment of a partial luminance histogram for an image.
FIG. 3B illustrates one embodiment of determining the tone differential for the least densely populated bins of a histogram for an image.
FIG. 3C illustrates one embodiment of determining the tone differential for the most densely populated bins of a histogram for an image.
FIG. 3D illustrates one embodiment of determining a tone mapping table using the tone differential based on an image.

DETAILED DESCRIPTION

The embodiments are generally directed to techniques designed to reduce power consumption without using intensive computations for an adaptive light method. Various embodiments provide techniques that include an adaptive light method to determine a histogram with a plurality of bins based on luminance for an image. A tone differential may be decreased based on a sum of pixel counts from adjacent bins. The image may be displayed based at least in part on a tone differential of a bin. Other embodiments are described and claimed.

Adaptive light methods and solutions have used intensive computational algorithms, such as floating point operations, which consume a large amount of power and memory. In conventional computing systems, the adaptive light solutions cannot meet performance requirements of low power architectures such as, but not limited to handheld devices. As such, there exists no efficient means today to limit power consumption of adaptive light solutions while maintaining high performance and good image quality. Consequently, various embodiments described herein provide an efficient means to reduce power consumption while achieving high performance and good image quality using an adaptive light method for low power architectures or devices. The various embodiments described herein may be more than twenty times faster than existing adaptive light solutions. The various embodiments described herein may consume twenty times less power than existing adaptive light solutions.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
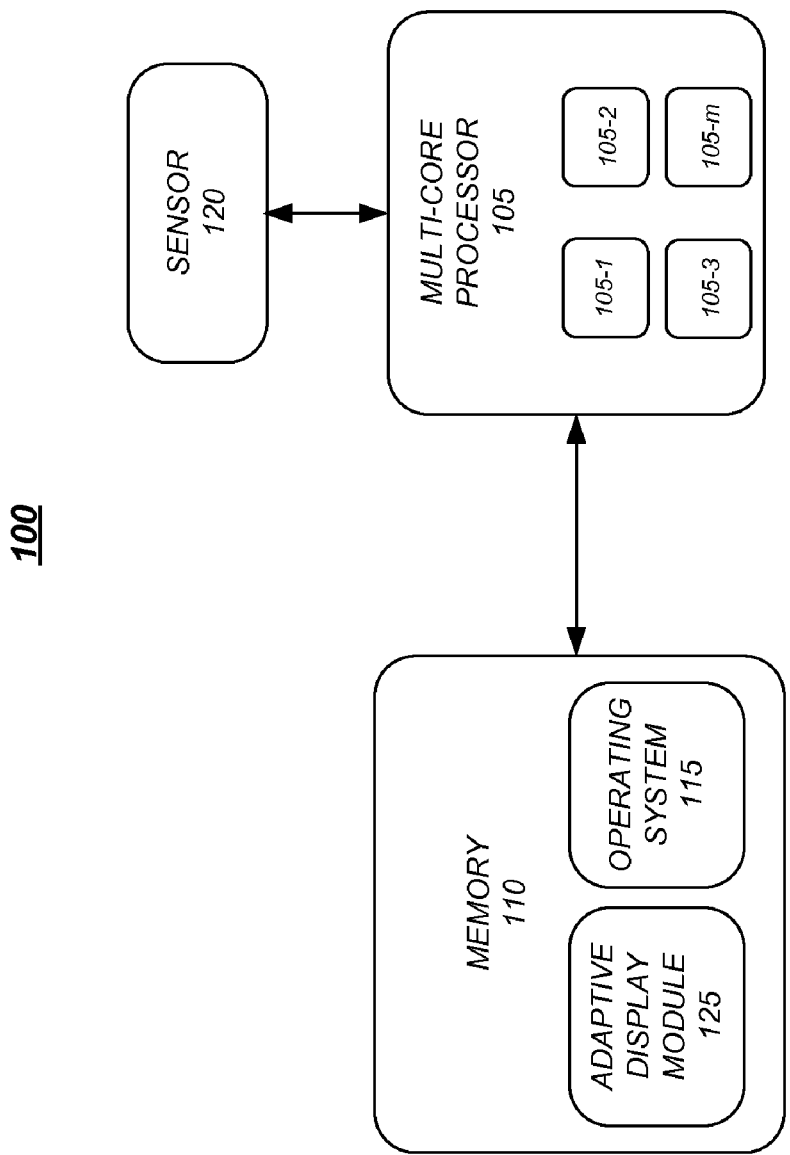
FIG. 1 illustrates one embodiment of an apparatus.

FIG. 1 illustrates one embodiment of an apparatus. FIG. 1 illustrates a block diagram of an apparatus 100. Apparatus 100 may comprise a computing system in some embodiments. As shown in FIG. 1, apparatus 100 comprises multiple elements, such as a multi-core processor 105 including cores 105-1-$m$, a memory 110, an operating system 115, a sensor 120 and an adaptive display module 125.

The embodiments, however, are not limited to the elements or the configuration shown in this figure.

In various embodiments, multi-core processor 105 may comprise a central processing unit may include one or more processor cores 105-1-$m$. The processor 105 may include any type of processing unit, such as, but not limited to, a computer processing unit (CPU), a multi-processing unit, a digital signal processor (DSP), a graphical processing unit (GPU) and an image signal processor. Alternatively, the multi-core processor may include a graphics accelerator or an integrated graphics processing portion. The present embodiments are not restricted by the architecture of the multi-core processor 105, so long as the multi-core processor 105 supports the modules and operations as described herein. The multi-core processor 105 may execute the various logical instructions according to the present embodiments.

In various embodiments, memory 110 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, Random Access Memory (RAM) which may include, but is not limited to SRAM, DRAM and SDRAM, Read Only Memory (ROM) which may include, but is not limited to PROM, EPROM and EEPROM, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. In an embodiment, memory 110 may be communicatively coupled to the processor 105.

Operating system (OS) 115 may comprise an interface between various hardware components of apparatus 100 and a user in some embodiments. In various embodiments, OS 115 may be responsible for the management and coordination of activities and the sharing of the resources of the computing system 100. In some embodiments, OS 115 may act as a host for a variety of computing applications run on computing system 100. For example, OS 115 may comprise a Windows© operating system by Microsoft Corporation© of Redmond, Wash. in some embodiments. Other embodiments are described and claimed.

Sensor 120 may comprise an ambient light sensor. A sensor 120 may be used to determine luminance information. In an embodiment, the sensor may use a meter or other device to measure the amount and color of the light obtained. In an embodiment, the sensor may convert light intensity to a digital signal output. In an embodiment, a processor 105 may be communicatively coupled to the sensor 120.

Adaptive display module 125 may use inputs from the sensor to determine an image to be displayed. The adaptive display module 125 may enhance the image by more clearly showing details in the light and/or dark areas of the image. The adaptive display module 125, when executed by the processor, may be operative to determine a histogram with a plurality of bins based on an image, decrease a tone differential based on a sum of pixel counts of adjacent bins, and display the image based at least in part on a tone differential of a bin.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe the features described above with reference to apparatus 100.

In various embodiments, luminance may be computed for an image. An image may include, but is not limited to, a graphic, a photograph and/or a video image. If the image is a YCbCr or a YUV image, the luminance does not need to be computed.

In an embodiment, a histogram may be determined 205. A histogram may include a plurality of bins. In an embodiment, the histogram may include 256 bins for luminance values 0 through 255. The histogram may be based on a luminance value for a pixel in an image. As represented in Equation 1, each bin may include all the pixels that have the same luminance value. For example, bin two may contain all the pixels with the luminance value of two.

$$\text{Hist}[i] = \text{number of pixels with } i \text{ luminance value; } i=0 \text{ to } 255. \quad \text{Equation 1}$$

In an embodiment, a tone differential for a bin in the histogram may be set. A tone differential table may be initialized. Each bin in the histogram may have a tone differential be initialized to equal one, as shown in Equation 2.

$$\text{ToneDiff}[i]=1; i=0 \text{ to } 255 \quad \text{Equation 2}$$

For each bin in the histogram, a total pixel count may be determined. The total pixel count may be set 210 equal to the number of the pixels in a bin plus the number of the pixels in an adjacent bin, as shown in Equation 3.

$$\text{TotalPixelCount}[i]=\text{Hist}[i]+\text{Hist}[i-1] \quad \text{Equation 3}$$

In an embodiment, the total pixel count may be set equal 210 to the sum of a first pixel count of a first bin and a second pixel count of a second bin. The second bin may be adjacent to the first bin. In an embodiment, the number of the bin may be equal to the luminance value. In an embodiment, an adjacent bin may be a bin with a luminance value that is one less than the selected bin. The total pixel count may be the sum of the number of pixels with a luminance value plus the number of pixels with a lower luminance value. For example, for bin 3, the total pixel count of bin 3 may equal the sum of the first pixel count of bin 3 (i.e., the number of pixels in bin 3 with luminance value 3) and the second pixel count of bin 2 (i.e., the number of pixels in bin 2 with luminance value 2).

In an embodiment, the total pixel count may be compared to the pixel threshold. In an embodiment, a pixel threshold may be the minimum number of pixels that may be located in two adjacent bins. In an embodiment the pixel threshold may be the total number of pixels in the image divided by 256 (the total number of bins) divided by 3, as shown in Equation 4.

$$\text{PixelThreshold}=\text{TotalNumberofPixels}/256/3 \quad \text{Equation 4}$$

In an embodiment, the total pixel count may be compared to the pixel threshold. In an embodiment, a pixel threshold may be a predefined and/or set value. In an embodiment, the threshold may be a floating and/or configurable value. The pixel threshold may be used to ensure that the density of the pixels in the bins is more equally distributed. A pixel threshold may be determined so that the pixels are spread more evenly throughout a histogram. By having pixels allocated more evenly in a histogram, an image may be more clearly displayed with increased detail in light and/or dark areas. As the bins in a histogram represent luminance values, the density of the bins may be determined by the number of pixels in a bin. The pixel threshold may be used to determine which adjacent luminance values have too few pixels. The total pixel count may be compared to the pixel threshold to determine adjacent bins that have a low pixel density. In an embodiment, when the sum of the pixels in a bin and an adjacent bin has fewer pixels than the pixel threshold, the bin may have a small density.

In order to obtain an adaptive light method for low power architectures that allows an image to display details in a light and/or dark area, bins with too few pixels (i.e., a bin and an adjacent bin having less than a pixel threshold), may be combined. In an embodiment, it may be determined when the total pixel count is less than a pixel threshold, as shown in Equation 5. When the total pixel count is less than the pixel threshold, the tone differential may be decreased 215. In an embodiment, when the total pixel count is less than the pixel threshold, the tone differential may be decreased by one. The tone differential may be set to zero when the total pixel count is less than the pixel threshold, as shown in Equation 6. In an embodiment, when the total pixel count is less than the pixel threshold, the pixel count of the first bin may be set 220 equal to the total pixel count, as shown in Equation 7.

$$\text{If TotalPixelCount}[i]<\text{PixelThreshold}, \quad \text{Equation 5}$$

$$\text{ToneDiff}[i]=0 \quad \text{Equation 6}$$

$$\text{Hist}[i]=\text{Hist}[i-1]+\text{Hist}[i] \quad \text{Equation 7}$$

For example, the second bin may have 40 pixels with a luminance value of two and a third bin may have 50 pixels with a luminance of there. The total pixel count of bin three may be 90. If the pixel threshold is 100, then the total pixel count of bin three is less than the pixel threshold. If the total pixel count is less than the pixel threshold, then the tone differential of the third bin may be decreased and set to zero. If the total pixel count is less than the pixel threshold, then the pixels in bin three may be set equal to the pixels in bin two plus the pixels in bin three. Using the example above, bin three may be set to equal to the total pixel count of 90 pixels. When a fourth bin is examined, the total pixel count will be 90, the pixels in bin three, plus the amount of pixels in bin four.

In an embodiment, every time the total pixel count is less than the pixel threshold, a change amount is increased by one. The change amount may be initialized to equal zero. The change amount may be used to count the number of bins which are to be less than the total threshold. The change amount counts the number of bins that have a tone differential of zero and will be combined. For each bin that has a total pixel count less than a pixel threshold, the change amount may be increased by one, as shown in Equation 8.

$$ChangeAmount = ChangeAmount + 1 \qquad \text{Equation 8}$$

In an embodiment, for each bin where the tone differential was decreased, a bin with the highest density may be determined 225. Tone differential value of a bin with the highest density may be increased 230. In an embodiment, a tone differential may be increased of a bin having a higher density. For example, if five different bins each had their tone differential decreased to zero, than five different bins may be selected to have their tone differential increased to two. In an embodiment, the five bins to have the tone differential increased to two are the five bins in the histogram with the highest density (i.e., the most number of pixels in the bin in the histogram). As shown in Equation 9 below, {Sj} is the histogram bins with the highest density.

$$ToneDiff[Sj] = 2; j = 1 \text{ to ChangeAmount} \qquad \text{Equation 9}$$

In an embodiment, the image may be displayed 235 based at least in part on a tone differential of a bin. In an embodiment, a tone mapping table may be determined in order to display the image. In an embodiment, the image may be displayed based on a tone mapping table derived from a tone differential of each bin. In an embodiment, a tone mapping table may be created based on the tone differential on the luminance for each pixel in the image. In an embodiment, a tone mapping table may balance the histogram by allocating less intensity levels to low density histogram bins and more intensity levels to high density histogram bins. In a tone mapping table, the tone differential of the first bin, bin zero, may be set to zero, as shown in Equation 10. A tone mapping value of the second bin may be equal to the sum of the tone mapping value of the first bin and the tone differential of the second bin, as shown in Equation 11.

$$ToneMapping[0] = 0 \qquad \text{Equation 10}$$

$$ToneMapping[i] = ToneMapping[i-1] + ToneDiff[i]; \\ i = 1 \text{ to } 255. \qquad \text{Equation 11}$$

It should be understood that in some embodiments that logic flow 200 may be implemented or arranged to perform tasks in parallel, including processing a plurality of threads and controlling a plurality of cores at substantially the same time. Moreover, it should also be understood that the logic flow 200 is only one example of a logic flow and that different numbers, orders and/or arrangements of the operations described in logic flow 200 could be implemented and still fall within the described embodiments. Other embodiments are described and claimed.

FIG. 3A illustrates one embodiment of a partial luminance histogram for an image. In an embodiment, the first four bins of a luminance histogram may be shown in FIG. 3A. Bin 0 310 may have 40 pixels having a luminance of 0. Bin 1 320 may have 30 pixels with a luminance of 1. Bin 2 330 may have 20 pixels with a luminance of 2. Bin 3 340 may have 220 pixels with a luminance of 3. The tone differential of each bin may be initialized to equal one.

FIG. 3B illustrates one embodiment of determining the tone differential for the least densely populated bins of a histogram for an image. FIG. 3B may illustrate the change in tone differential for the least densely populated bins. In an embodiment, the pixel threshold may be determined to be 100. Bin 0 310 may remain with a tone differential of 1 as there is no bin prior to bin 0.

The tone differential of bin 1 320 may be determined by comparing the total pixel count of bin 1 with the pixel threshold. The total pixel count of bin 1 320 may be determined by adding the number of pixels in bin 1 with the number of pixels in bin 0. The total pixel count of bin 1 may be equal to 70 (40+30). As the total pixel count of bin 1 is less than the pixel threshold, the tone differential of bin 1 may be decreased and set to 0. The pixel count of bin 1 may be set equal to the total pixel count (70).

The total pixel count of bin 2 330 may be determined by adding the number of pixels in bin 2 with the number of pixels in bin 1. The total pixel count of bin 2 may be the sum of the pixel count of bin 2 (20) and the pixel count of bin 1 (70). As the total pixel count of bin 2 is 90, the total pixel count of bin 2 is less than the pixel threshold. The tone differential of bin 2 may be decreased and set to 0 and the pixel count of bin 2 may be set to 90.

The total pixel count of bin 3 340 may be determined by adding the number of pixels in bin 3 (220) with the number of pixels in bin 2 (90). As the total pixel count of bin 3 is 310, the total pixel count of bin 3 is greater than the pixel threshold. Since the total pixel count is greater than the threshold, the tone differential may remain 1 and the pixel count of bin 3 may remain 220.

FIG. 3C illustrates one embodiment of determining the tone differential of the most densely populated bins of a histogram for an image. In an embodiment, since two bins each had their tone differential decreased to zero, two bins must each have their tone differential increased to two. Looking at all 256 bins, the two bins with the largest number of pixels (i.e., the most densely populated bins) may be determined. In an embodiment, bin 3 340, with 220 pixels, may be the part of the two most densely populated bins. If bin 3 340 is the most or second-most densely populated bin, the tone differential of bin 3 340 may be changed to 2. Please note that in this example, two bins have had the tone differential set to zero, so two bins would need to have their tone differential set to one. As there are 256 bins, bin 3 340 and a second bin, not shown in FIG. 3C may be the two most densely populated bins and may have the tone differential set to two.

FIG. 3D illustrates one embodiment of determining a tone mapping table using the tone differential based on an image. Based on the tone differentials in FIG. 3C, the tone mapping table may be determined. The tone mapping table may be used to determine the output and display of the image. FIG. 3D depicts the tone mapping table. Bin 0 310 may be set to 0 in the table. Bin 1 320 may be set to be equal to the tone mapping value of bin 0 plus the tone differential of bin 1. In an embodiment, bin 1 320 may be set to 0 in the tone mapping table. Bin 2 330 may be set to be equal to the tone mapping value of bin 1 plus the tone differential of bin 2. In an embodiment, bin 2 330 may be set to 0 in the tone mapping table. Bin 3 340 may be set to be equal to the tone differential of bin 2 plus the tone mapping value of bin 3. In an embodiment, bin 3 340 may be set to 2 in the tone mapping table. As a result of the tone mapping table shown in FIG. 3D, bins 0, 1 and 2 may be combined to use one output luminance while bin 3 will use an output luminance value that is two plus the output luminance value of its proceeding adjacent bin.

Figure 4:
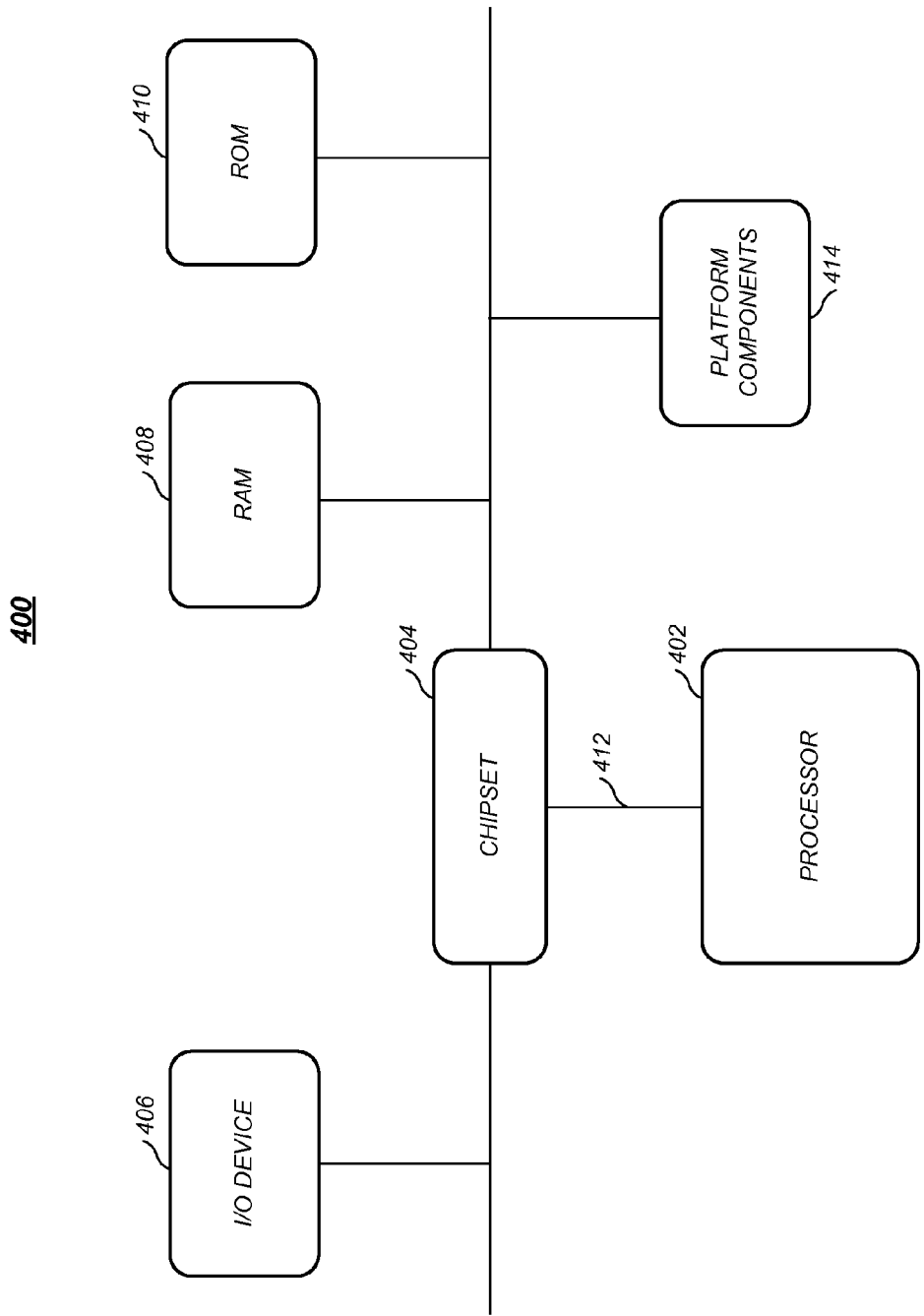
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, central processing unit (CPU), multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first,'" "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a computer-readable storage medium containing instructions that when executed by a processor enable a system to:
    determine a histogram with a plurality of bins based on luminance for an image;
    decrease a tone differential of a sum of pixel counts of adjacent bins; and
    display the image based at least in part on a tone differential of a bin.

2. The article of claim 1 wherein instructions that when executed enable the system to decrease a tone differential comprise instructions that when executed enable the system to:
    set a total pixel count to a sum of a first pixel count of a first bin and a second pixel count of a second bin, wherein the second bin is adjacent to the first bin, and
    when the total pixel count is less than a pixel threshold, decrease a tone differential of the first bin.

3. The article of claim 1, further comprising instructions that when executed enable the system to increase a tone differential of a bin having a higher density.

4. The article of claim 2, further comprising instructions that when executed enable the system to determine the pixel threshold based on a total number of pixels in the image.

5. The article of claim 1 wherein instructions that when executed enable the system to decrease a tone differential comprise instructions that when executed enable the system to decrease the tone differential to zero.

6. The article of claim 1 wherein instructions that when executed enable the system to display the image comprise instructions that when executed enable the system to determine a tone mapping table.

7. The article of claim 6 wherein instructions that when executed enable the system to determine a tone mapping table comprise instructions that when executed enable the system to set the tone mapping table equal to a sum of a tone differential of a first bin and a tone mapping value of an adjacent bin.

8. The article of claim 1, further comprising instructions that when executed enable the system to determine a luminance of the image.

9. The article of claim 1 wherein a bin represents a luminance value.

10. The article of claim 1, further comprising instructions that when executed enable the system to initialize a tone differential in a bin to equal one.

11. A computer-implemented method comprising:
    determining, by a processor, a histogram with a plurality of bins based on luminance for an image;
    decreasing a tone differential based on a sum of pixel counts of adjacent bins; and
    displaying the image based at least in part on a tone differential of a bin.

12. The computer-implemented method of claim 11 wherein decreasing a tone differential comprises:
    setting a total pixel count equal to a sum of a first pixel count of a first bin and a second pixel count of a second bin, wherein the second bin is adjacent to the first bin; and
    when the total pixel count is less than a pixel threshold, decreasing a tone differential of the first bin.

13. The computer-implemented method of claim 11, further comprising:
    increasing a tone differential of a bin having a higher density.

14. The computer-implemented method of claim 11 wherein decreasing a tone differential comprises decreasing the tone differential to zero.

15. The computer-implemented method of claim 11 wherein displaying the image comprises determining a tone mapping table.

16. A system, comprising:
    a sensor;
    a processor communicatively coupled to the sensor; and
    a memory communicatively coupled to the processor, the memory to store an adaptive display module that when executed by the processor is operative to determine a histogram with a plurality of bins based on an image, decrease a tone differential based on a sum of pixel counts from adjacent bins, and display the image based at least in part on a tone differential of a bin.

17. The system of claim 16 wherein the adaptive display module that when executed by the processor is operative to decrease a tone differential comprises the adaptive display module that when executed by the processor is operative to:
    set a total pixel count equal to a sum of a first pixel count of a first bin and a second pixel count of a second bin, wherein the second bin is adjacent to the first bin, and
    when the total pixel count is less than a pixel threshold, decrease a tone differential of the first bin.

18. The system of claim 16 wherein the memory to store an adaptive display module that when executed by the processor is operative to increase a tone differential of a bin having a higher density.

19. The system of claim 16 wherein the adaptive display module that when executed by the processor is operative to display the image comprises the adaptive display module that when executed by the processor is operative to determine a tone mapping table.

20. The system of claim 16 wherein the memory to store an adaptive display module that when executed by the processor is operative to determine a luminance of the image.

* * * * *